Nov. 15, 1960  G. P. McCORD  2,960,105
MOLD CONNECTION AND COUNTER
Filed Nov. 9, 1956
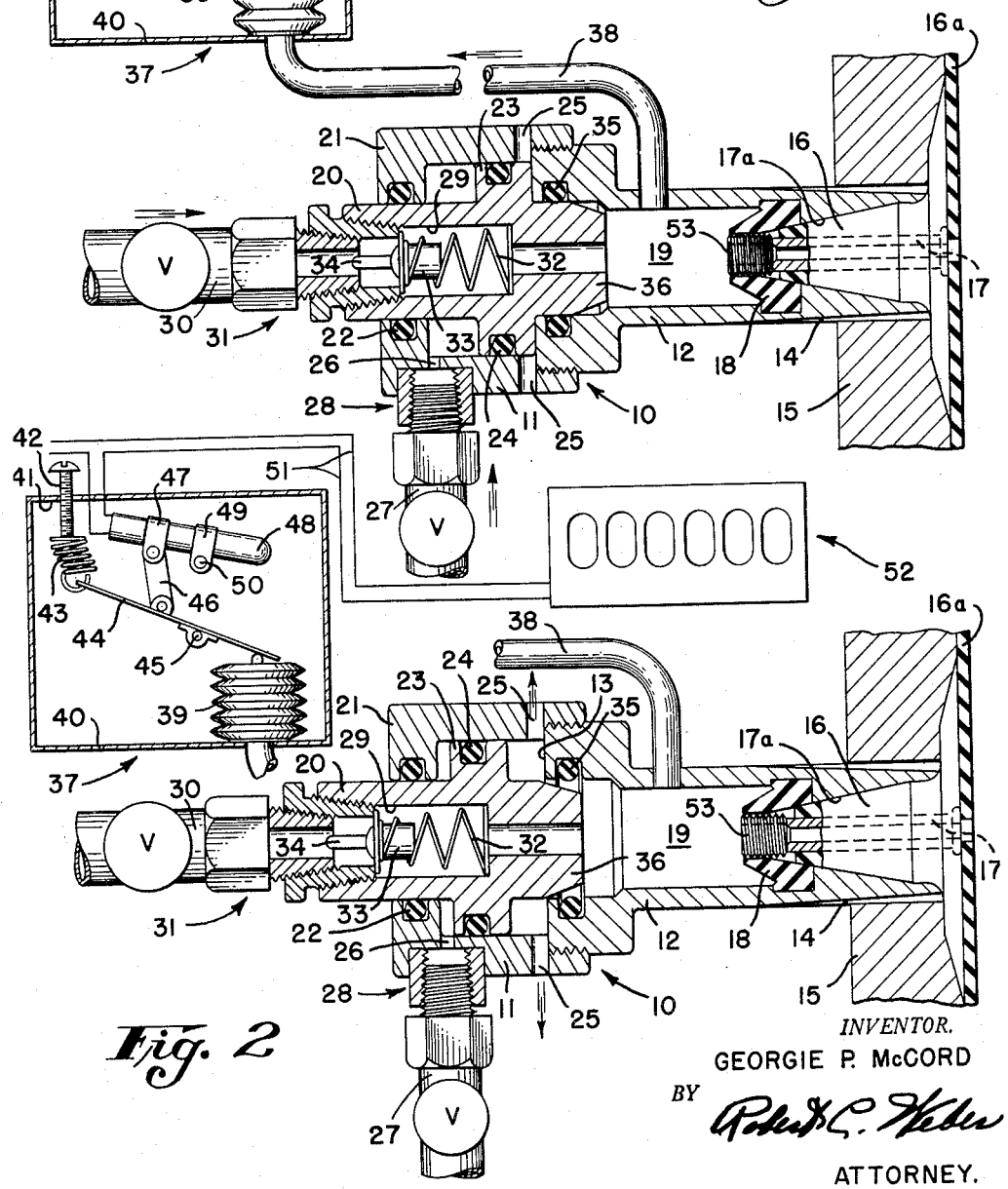
INVENTOR.
GEORGIE P. McCORD
BY
ATTORNEY.

United States Patent Office 2,960,105
Patented Nov. 15, 1960

2,960,105

MOLD CONNECTION AND COUNTER

Georgie P. McCord, Oaklandon, Ind., assignor to United States Rubber Company, New York, N.Y., a corporation of New Jersey Filed Nov. 9, 1956, Ser. No. 621,414

6 Claims. (Cl. 137—228)

The present invention relates to devices for inflating and deflating articles.

More particularly, the present invention relates to a coupling for placing an article to be inflated and deflated in communication first with a source of fluid under pressure and then with the outer atmosphere so that the article is inflated and then deflated.

For example, inner tubes of tires are cured by being inflated against the walls of a suitable mold whose walls are heated, and then the inner tubes are deflated. The coupling of the invention may be used to place such an inner tube first in communication with a source of fluid under pressure and then in communication with the outer atmosphere.

One of the objects of the present invention is to provide a coupling of this type which is simply and ruggedly constructed and reliable in operation.

Another object of the present invention is to provide a coupling which discharges a fluid from a deflating article to the outer atmosphere while preventing the discharging fluid from communicating with lines which supply the fluid under pressure during inflation of the article, so that these lines cannot become clogged with foreign particles or the like carried by the discharging fluid.

A further object of the present invention is to provide a counting means which cooperates with the coupling for reliably and accurately counting the number of articles inflated.

A particular feature of the present invention resides in placing a pressure-responsive counting means in communication with a pressure chamber from which fluid under pressure flows directly into the article being inflated for counting the number of times that the pressure in the chamber builds up to a given value.

The invention is illustrated, by way of example, in the accompanying drawings, in which:

Fig. 1 is a sectional elevational view of a coupling and counting means according to the present invention, and the parts being shown in the position they take during inflation of an article; and Fig. 2 shows the parts of Fig. 1 in the position they take during deflation of the article.

As is shown in the drawings, the coupling means includes an elongated tubular housing 10 made up of a pair of elongated tubular portions 11 and 12. The tubular housing portion 11 has an inner diameter greater than that of the housing portion 12 and has a right open end, as viewed in the drawings, in threaded engagement with the left open end of the housing portion 12. The left end face of the housing portion 12 thus forms a shoulder 13 (Fig. 2) in the interior of housing 10 located between portions 11 and 12 thereof.

The housing 10 is connected at portion 12 thereof to an inner-tube curing mold 15 (only a portion of which is shown), and housing portion 12 is formed in its outer face with axial venting grooves 14 at a part thereof which extends into an opening of mold 15, with a press fit, for example. The venting grooves 14 permit the escape of air that may be trapped between the tube 16a and the mold 15.

The inner surface of housing portion 12 is provided with a tapered bore 17a at the right open end thereof, as shown in the drawings, and this end of the housing receives in a fluid-tight manner a correspondingly tapered rubber covered valve stem 16 securely attached to a raw inner tube 16a and placed in a conventional curing mold 15 in which inner tubes are cured. The valve stem 16 is formed with a hollow metal tubular insert 17 communicating with the interior portion 19 of housing 10 and with the interior of the inner tube 16a. The valve stem 16 of the article to be inflated and deflated, through which fluid flows into and out of the article, is adapted to pass through bore 17a into the housing 10. In the illustrated example the valve stem 16 is provided with a conventional threaded end 53 on the valve stem insert 17 which communicates with and extends from the inner tube. When the inner tube is placed in the mold, the attendant passes the valve stem 16 through the bore 17a until the threaded end 53 engages a sealing member 18, yet to be described.

The housing portion 12 carries in its interior a sealing means for placing the valve end 53 in fluid-tight communication with the interior portion 19 of the housing, this interior housing portion 19 forming a pressure chamber, as will be apparent from the description below. This sealing means is in the form of a tubular member 18 which receives the end 53 of valve stem 16 and is made of a flexible, elastic material, such as rubber. The housing portion 12 is formed next to its tapered end with an inner annular groove which receives the right end portion of member 18, as viewed in the drawings. The outer surface of member 18 which extends to the left of this inner groove of housing portion 12 is tapered and spaced from the inner surface of housing portion 12, so that a fluid under pressure in chamber 19 will compress member 18, at its left free end, as viewed in the drawing, radially inwardly to press the sealing member about the end 53 of the valve stem into fluid-tight engagement therewith.

A flow control means is provided to control the flow of fluid to and from the interior portion 19 of housing 10, and this means includes a plunger 20 which extends slidably through an opening in the end wall 21 of housing portion 11. End wall 21 is formed with an annular groove which receives sealing ring 22 which engages plunger 20 so that the plunger extends in a fluid-tight manner through end wall 21. The plunger 20 is provided with an annular flange 23 in slidable engagement with the inner surface of housing portion 11, and this flange is formed with a groove which receives a sealing ring 24 which provides fluid-tight engagement between flange 23 and the inner surface of housing portion 11.

The housing portion 11 is formed adjacent shoulder 13 with one or more openings 25 communicating with the outer atmosphere and with an opening 26 axially spaced from the lower opening 25 of the drawings. Opening 26 communicates through suitable fittings 28 with a conduit 27 which communicates through suitable valves with a source of fluid under pressure, such as compressed air. The flange 23 of plunger 20 is located between opening 26 and shoulder 13.

The plunger 20 is formed with an axial bore 29 which passes therethrough and communicates through suitable fittings 31 with a conduit 30 which communicates through suitable valves with a source of fluid under pressure, such as compressed air. Conduit 30 is flexible so that it does not influence the movement of the plunger 20.

A non-return valve is located in bore 29 to provide fluid flow only in a direction toward chamber 19. This valve includes a coil spring 32 which presses at its right end, as viewed in the drawing, against a shoulder of the bore 29 and which urges a valve member 33 against a valve seat formed by the right end of the series of fittings 31, as viewed in the drawing. Valve member 33 has an extension 34 fixed thereto for limiting the tilting of the valve member.

The housing portion 12 is formed in its interior adjacent openings 25 with an annular groove which receives a sealing ring 35. The right end portion 36 of plunger 20, as viewed in the drawing, is in fluid-tight engagement with sealing ring 35 when the plunger is in the position of Fig. 1 to prevent chamber 19 from communicating with the outer atmosphere through openings 25.

A counting means 37 cooperates with the coupling means described above to count the number of articles inflated and cured. Counting means 37 includes a tube 38 which communicates at one end with chamber 19 and at its opposite end with a bellows 39. Bellows 39 is carried by a stationary housing 40 and cooperates with an electrical switch means which closes when the bellows expands and opens when the bellows contracts.

The switch means includes a screw 42 which passes threadedly through the inner wall 41 of housing 40 and which has its bottom end turnably connected to the top end of a coil spring 43 whose bottom end is connected to one end of a lever 44 pivotally mounted intermediate its ends on a pin 45 carried by the housing 40 and having a free end distant from spring 43 urged by the latter into engagement with the top end of bellows 39. Between spring 43 and pin 45 lever 44 is pivotally connected to the lower end of a link 46 whose upper end is pivotally connected to a strap 47 which extends about a mercury switch 48 carried by a strap 49 which extends about the mercury switch and is pivotally supported by a pin 50 which is carried by the housing 40. Switch 48 carries in its interior a pair of spaced contacts located at the left end of the switch to be electrically connected by the mercury in the switch when the latter is tilted to the position shown in Fig. 1. These contacts are connected respectively with a pair of leads 51 electrically connected with any suitable source of current and connected electrically with a conventional electrically operable counter 52 which registers the number of times that the switch 48 closes.

When the above-described structure is at rest the parts thereof have the position shown in Fig. 2. After an inner tube is placed in the curing mold 15 with valve stem 16 in bore 17a and threaded end 53 in engagement with sealing means 18, suitable valves are actuated to cause fluid under pressure to flow through conduits 27 and 30 in the direction of the arrows shown in Fig. 1. The fluid entering housing 10 through opening 26 acts on flange 23 to urge plunger 20 to the right, as viewed in the drawings. The fluid flowing along bore 29 acts on the shoulder engaged by spring 32 also to urge the plunger 20 to the right. The area of the flange and shoulder is greater than the area of the right end face of plunger 20, as viewed in the drawings, and chamber 19 is in communication with the outer atmosphere through opening 25 so that the plunger shifts to the operating position thereof shown in Fig. 1 to close chamber 19. The fluid in chamber 19 flows through valve stem insert 17 to inflate the inner tube, and as the pressure in chamber 19 builds up the bellows 39 expands to move switch means 42—50 from the position of Fig. 2 to that of Fig. 1 so as to actuate the counter 52. Screw 42 may be turned to adjust the tension of spring 43 required to be overcome by bellows 39 in order to close switch 48, so that the counter 52 will be actuated only when the pressure in chamber 19 builds up to a desired or given value. In this way the pressure-responsive counter means 37 reliably and accurately counts the number of articles actually inflated and cured.

When it is desired to deflate the inner tube, the valves are actuated to cut off the supply of fluid under pressure to conduits 27 and 30 and place conduit 27 in communication with the outer atmosphere. The fluid in chamber 19 now shifts plunger 20 back to the position of Fig. 2, and the inner tube deflates through chamber 19 and openings 25, as shown by the arrows in Fig. 2. Also, fluid flows from bellows 39 through tube 38, chamber 19, and openings 25 to the outer atmosphere. Spring 43 is thus free to return the switch means to the position of Fig. 2.

It will be noted that the fluid which is discharged during deflation cannot reach conduits 27 and 30 so that the latter cannot become clogged with particles in the discharging fluid.

Having thus described my invention, what I claim and desire to protect by Letters Patent is:

1. In a device for inflating and deflating an article having a fitting through which fluid flows into and out of the article, in combination, a housing, sealing means carried by said housing and immovable relative thereto for placing an interior portion of said housing in fluid-tight communication with a fitting of an article to be inflated, operable means carried by said housing and movable relative thereto for placing said interior portion of said housing alternately in communication with a source of fluid under pressure and with the outer atmosphere, said interior portion being positioned between said sealing means and said operable means, and fluid pressure responsive counting means communicating with said interior portion of said housing for counting the number of times that the pressure therein builds up to a given value upon establishment, by said operable means, of communication between said source of fluid under pressure and said interior portion of said housing, said counting means being vented to the atmosphere via said interior portion when the latter is placed in communication with the atmosphere by said operable means.

2. In a device for inflating and deflating an article having a fitting through which fluid flows into and out of the article, in combination, a housing, sealing means carried by said housing and immovable relative thereto for placing an interior portion of said housing in fluid-tight communication with a fitting of an article to be inflated, said housing being provided beyond said interior portion thereof with an opening communicating with the outer atmosphere, flow control means carried by said housing and movable relative thereto between an operating position closing the interior portion of said housing from said opening thereof and providing communication between said interior portion of said housing and a source of fluid under pressure and a rest position providing communication between said interior portion of said housing and said opening thereof, said interior portion being positioned between said sealing means and said flow control means, and fluid pressure-responsive counting means communicating with said interior portion of said housing for counting the number of times that the pressure therein builds up to a given value, said flow control means when in said operating position ensuring flow of said fluid under pressure to said counting means, and when in said rest position enabling exhaustion of the said fluid from said counting means to the atmosphere via said opening.

3. An inflation-deflation device comprising, in combination, an elongated tubular housing having a first elongated portion provided with a pair of axially spaced openings and a second elongated portion of a smaller inner diameter than said first portion, said housing having an inner annular shoulder located between said first and second portions thereof adjacent one of said openings, said one opening communicating with the outer atmosphere and the other opening being adapted to communicate with a source of fluid under pressure, an elongated plunger provided with an axial bore passing therethrough and extending slidably and fluid-tightly through an end of said housing into said first portion thereof, said plunger having an annular flange in slidable, fluid-tight engagement with the inner surface of said first housing portion and located between said other opening and said shoulder so that fluid under pressure entering said first housing portion through said other opening thereof shifts said plunger toward said shoulder to an operating position closing off said second housing portion from said one opening and thus from the outer atmosphere, a non-return valve in said axial bore of said plunger providing fluid flow therethrough only in a direction toward said second housing portion when said axial bore communicates with a source of fluid under pressure, and sealing means in said second housing portion spaced from said plunger for providing fluid-tight communication between the interior of said second housing portion and a fitting of an article to be inflated, the fluid under pressure in said second housing portion shifting said plunger away from said second housing portion, when the axial bore of said plunger and said other opening are placed out of communication with fluid under pressure, to a rest position providing communication between said second housing portion and said one opening, so that the pressure fluid in said second housing portion exhausts through said one opening to the outer atmosphere when said plunger is in its rest position.

4. A coupling device as recited in claim 3, further comprising a sealing ring carried by said second housing portion in the interior thereof adjacent said shoulder which engages said plunger, when the latter is in its operating position, so as to be in fluid-tight engagement, therewith to insure said closing off of said second housing portion from said one opening.

5. In a device as recited in claim 1, said counting means comprising a tube communicating with said interior portion of said housing, a bellows communicating with said tube, electrical switch means cooperating with said bellows to be closed when the bellows expands and opened when the bellows contracts, and a counter connected electrically with said switch means for indicating the number of times that said switch means closes.

6. A device as recited in claim 4, further comprising fluid pressure responsive counting means in direct communication with said second housing portion, whereby when said plunger is in said operating position thereof pressure fluid is admitted to said counting means, while when said plunger is in said rest position thereof the pressure fluid in said counting means is exhausted to the atmosphere via said second housing portion and said one opening.

References Cited in the file of this patent

UNITED STATES PATENTS

| | | |
|---|---|---|
| 1,805,397 | Harris | May 12, 1931 |
| 1,836,655 | Dunford | Dec. 5, 1931 |
| 1,977,118 | De Mattie | Oct. 16, 1934 |